United States Patent
Berger et al.

(10) Patent No.: US 10,724,447 B2
(45) Date of Patent: Jul. 28, 2020

(54) FUEL INJECTOR ARRANGEMENT

(71) Applicant: Woodward L'Orange GmbH, Stuttgart (DE)

(72) Inventors: Ingmar Joachim Berger, Stuttgart (DE); Enrico Bärow, Stuttgart (DE); Michael Nitsche, Schwieberdingen (DE)

(73) Assignee: Woodward L'Orange GmbH, Stuttgart (DE)

( * ) Notice: Subject to any disclaimer, the term of this patent is extended or adjusted under 35 U.S.C. 154(b) by 0 days.

(21) Appl. No.: 16/469,067

(22) PCT Filed: Dec. 13, 2017

(86) PCT No.: PCT/EP2017/001424
§ 371 (c)(1),
(2) Date: Jun. 12, 2019

(87) PCT Pub. No.: WO2018/108317
PCT Pub. Date: Jun. 21, 2018

(65) Prior Publication Data
US 2020/0072136 A1    Mar. 5, 2020

(30) Foreign Application Priority Data
Dec. 16, 2016   (DE) .................. 10 2016 015 037

(51) Int. Cl.
*F02M 47/04*       (2006.01)
*F02D 19/06*       (2006.01)
(Continued)

(52) U.S. Cl.
CPC ........... *F02D 19/061* (2013.01); *F02M 43/04* (2013.01); *F02D 19/0694* (2013.01);
(Continued)

(58) Field of Classification Search
CPC .. F02D 19/061; F02D 19/0694; F02D 19/105; F02D 41/0025; F02D 41/0027;
(Continued)

(56) References Cited

U.S. PATENT DOCUMENTS

| 5,632,253 A |   | 5/1997 | Paul et al. |
| 5,671,717 A | * | 9/1997 | Rembold ............... F02M 25/03 |
|             |   |        | 123/25 C |

(Continued)

FOREIGN PATENT DOCUMENTS

| DE | 112007001288 | 4/2009 |
| EP | 0546982      | 6/1993 |
| WO | WO9851925    | 11/1998 |

OTHER PUBLICATIONS

PCT International Preliminary Report on Patentability in International Application No. PCT/EP2017/001424, dated Jun. 27, 2019, 6 pages.

(Continued)

*Primary Examiner* — Hai H Huynh
(74) *Attorney, Agent, or Firm* — Fish & Richardson P.C.

(57) ABSTRACT

The invention relates to a fuel injector arrangement (1) comprising a number of fluid supply paths (29, 31, 39), namely, a first (29), a second (31) and a third fluid supply path (39). The fuel injector arrangement (1) has a first switching device (43) in the second fluid supply path (31). Said first switching device, controlled by the fluid pressure in the third fluid supply path (39), opens or blocks the second fluid supply path (31). The fuel injector arrangement (1) has a second switching device (49) in the first fluid supply path (29). Said second switching device, controlled by the fluid pressure downstream of the first switching device (43) in the second fluid supply path (31), opens or blocks the first fluid supply path (29).

20 Claims, 1 Drawing Sheet

(51) Int. Cl.
*F02M 43/04* (2006.01)
*F02D 19/10* (2006.01)

(52) U.S. Cl.
CPC ......... *F02D 19/105* (2013.01); *F02M 47/046* (2013.01); *F02M 2200/40* (2013.01); *F02M 2200/44* (2013.01)

(58) Field of Classification Search
CPC .... F02M 43/04; F02M 47/046; F02M 47/027; F02M 2200/40; F02M 2200/44; F02M 21/0251; F02M 21/0263; F02M 63/0017; F02M 63/0043; F02M 63/0054; F02M 63/0047; F02M 63/0028; Y02T 10/32; Y02T 10/36
USPC ....... 123/472, 478, 479, 490, 525, 575, 576, 123/577, 578, 27 GE
See application file for complete search history.

(56) References Cited

U.S. PATENT DOCUMENTS

| | | | |
|---|---|---|---|
| 6,540,160 B2* | 4/2003 | Rodriguez-Amaya | F02M 45/02 123/305 |
| 6,651,626 B2* | 11/2003 | Rodriguez-Amaya | F02M 45/00 123/446 |
| 2009/0314262 A1* | 12/2009 | Sellentin | F02D 19/066 123/557 |

OTHER PUBLICATIONS

International Search Report and Written Opinion in International Application No. PCT/EP2017/001424, dated Feb. 21, 2018, 10 pages.

* cited by examiner

FUEL INJECTOR ARRANGEMENT

CROSS-REFERENCE TO RELATED APPLICATIONS

This application is a U.S. National Phase application under 35 U.S.C. § 371 and claims the benefit of priority to International Application Serial No. PCT/EP2017/001424, filed on Dec. 13, 2017, which claims priority to German Application No. 102016015037.8, filed on Dec. 16, 2016, the contents of which are hereby incorporated by reference.

TECHNICAL FIELD

The present disclosure relates to a fuel injector arrangement according to claim 1.

BACKGROUND

Fuel injector arrangements are known in the prior art which have a fuel injector for distributing combustion gas, and which use a control fluid such as control oil for controlling particular combustion gas nozzle valve elements of the fuel injector, i.e., one or more combustion gas nozzle valve elements. To prevent combustion gas from unintentionally passing into the control fluid control circuit during combustion gas operation, in particular due to creepage paths along particular combustion gas nozzle valve element guides, the use of barrier fluid (barrier oil) may be provided for media separation or sealing at particular combustion gas nozzle valve element guides, i.e., within the scope of barrier fluid seals around particular combustion gas nozzle valve elements (in addition, further barrier fluid seals may be provided elsewhere in the fuel injector).

In such combustion gas injectors, in terms of operational and functional reliability it is important to reliably avoid gas leaks, for which purpose the media, namely control fluid, combustion gas, and barrier fluid, must be switched in a specified order. Such switching at preferably brief intervals must be regulated in a complicated manner from the injector periphery. Emergency shut-off situations, in which generally first the gas pressure is switched off while the control fluid pressure and the barrier oil pressure disadvantageously continue to prevail, are also problematic. This may inadvertently result in high spring load on springs installed in the injector, to such an extent that the combustion gas pressure is then no longer available for maintaining the pressure equilibrium.

SUMMARY

On this basis, the object of the present disclosure is to provide a fuel injector arrangement of the above-mentioned type which overcomes the disadvantages of the prior art.

This object is achieved by a fuel injector arrangement having the features of claim 1.

Advantageous refinements and embodiments are set forth in the further claims.

According to the disclosure, a fuel injector arrangement is proposed, preferably having a fuel injector, in particular for operation with combustion gas, for example in the form of natural gas, specialty gas, landfill gas, biogas, hydrogen, or the like. The fuel injector may be a single fuel injector that is provided only for spraying out combustion gas, or alternatively and preferably may be a dual-fuel fuel injector, which in addition to combustion gas may also spray out liquid fuel, for example diesel fuel, heavy fuel oil, or bio-oil.

Such a fuel injector may be provided for an ignition jet operation, for example, in which the combustion gas is ignited using a small injection quantity of liquid fuel (ignition jet). The fuel injector arrangement, which preferably has a fuel injector as discussed above, is preferably an integral part of a common rail fuel injection device.

The fuel injector arrangement may generally be used, for example, with a large engine, for example in a motorized vehicle such as a ship, a locomotive, a special purpose vehicle, or a utility vehicle, or for a stationary unit, for example, such as a cogeneration unit or an (emergency) power generator, in particular also for industrial applications.

The proposed fuel injector arrangement, which is configured in particular for supplying (different) fluids to a fuel injector preferably as discussed above, has a number of fluid supply paths via which one fluid in each case may be conducted in particular to a required position in a fuel injector, namely, a first fluid supply path (in particular a control fluid path), a second fluid supply path (in particular a combustion gas path), and a third fluid supply path (in particular a barrier fluid path). These fluid supply paths, one on each downstream side, are provided and configured to preferably open into or within a fuel injector, in particular the fuel injector arrangement (at particular required positions). In this regard, a particular fluid supply path may extend, at least in sections in each case, inside and/or outside such a fuel injector. A fluid supply path in question is formed in particular as a line, also by means of a drilled channel, for example.

The first, second, and third fluid supply paths, in particular for use with a fuel injector, are discussed below.

The first fluid supply path is provided for feeding or supplying control fluid, in particular control fluid such as control oil under high pressure, to a control circuit, in particular to an input thereof (corresponding to the required position), for the (lift) control of at least one combustion gas nozzle valve element of the fuel injector. Such a control circuit may be formed, for example, by a piston control assembly (which preferably operates, in a manner of speaking, as a double-acting hydraulic cylinder) and an associated control valve that allow lift control of particular combustion gas nozzle valve elements. For this purpose, a particular combustion gas nozzle valve element, in particular at an end section remote from the nozzle, may be connected to a piston that may be controlled to move back and forth within the scope of the piston control assembly. In addition, a combustion gas nozzle assembly of the fuel injector may be formed at an opposite end section of a combustion gas nozzle valve, near the nozzle, that is lift-controllable in this way. On the upstream side, the control fluid path is provided for connection to a control fluid source.

The second fluid supply path of the fuel injector arrangement, in particular for supplying combustion gas, is led in the fuel injector, for example at a downstream combustion gas nozzle chamber (corresponding to the required position), for example at an annular space for a plurality of combustion gas nozzle valve elements, and from the nozzle chamber, combustion gas is sprayable via a downstream combustion gas nozzle assembly as mentioned above, with lifting of a combustion gas nozzle valve element from a seat, or in general with the opening of a combustion gas nozzle valve of the fuel injector. The supply of combustion gas to an upstream side of the second fluid supply path may be provided, for example, by means of a combustion gas source, for example at a pressure level in the range of 350 bar or greater.

The third fluid supply path of the fuel injector arrangement is provided for supplying a barrier fluid system or a barrier fluid seal system in the fuel injector with a barrier fluid, i.e., to form one or a number of barrier fluid seals (corresponding to required positions) at at least one element of the fuel injector that is guided by combustion gas. A barrier fluid seal is in particular a seal that is formed by a hydraulic fluid (barrier oil) that is acted on by pressure, also preferably by means of a barrier fluid seal chamber. With a barrier fluid seal formed in this way, which in particular encloses the element that is guided by combustion gas, combustion gas may be effectively prevented from flowing over into a control fluid portion of the fuel injector along the guide of the element, in particular a gap guide. Such a barrier fluid seal is preferably formed at the fuel injector along a guide of a particular combustion gas nozzle valve element, i.e., to prevent combustion gas from passing over from the combustion gas nozzle chamber, near the nozzle, along the guide into the control fluid control circuit remote from the nozzle. The third fluid supply path is provided, for example, for acting with a pressure level slightly higher than that of the combustion gas pressure, for example with a pressure level of approximately 5 to 10% above that of the combustion gas pressure.

The proposed fuel injector arrangement also has a first switching device in the second fluid supply path, which, controlled via the fluid pressure in the third fluid supply path, opens or blocks the second fluid supply path. In this regard, the fluid in the third fluid supply path, i.e. in particular barrier fluid, represents a control medium for the first switching device (or acts as such), the first switching device switching into the open or blocked position as a function of the barrier fluid pressure level (or of the barrier fluid pressure level also thus prevailing at the first switching device), thus opening or blocking the second fluid supply path. In particular, the first switching device is hereby controlled solely via the barrier fluid pressure.

The fuel injector arrangement also has a second switching device in the first fluid supply path which, controlled via the fluid pressure in the second fluid supply path downstream from the first switching device, opens or blocks the first fluid supply path. In this regard, the fluid in the second fluid supply path, i.e. in particular combustion gas, is used as the control medium for the second switching device, which preferably may have a design similar to the first switching device, and which also switches into the open or blocked position as a function of the combustion gas pressure level downstream from the first switching device (in the second fluid supply path), and in this regard, also as a function of the combustion gas pressure level prevailing at the second switching device, thus opening or blocking the first fluid supply path. In particular, the second switching device is also hereby controlled solely via the combustion gas pressure that prevails downstream from the first switching device.

For the (fluid) pressure control, the first and/or the second switching device may in particular be configured in such a way that it/they switch(es) into the open position when a first switching threshold is exceeded, thus opening the particular fluid supply path, and switch(es) into the blocked position when the pressure falls below the first switching threshold. The first switching threshold may be selected, for example, to be slightly below a (setpoint) operating pressure level of the particular control medium (barrier fluid or combustion gas), so that a safety margin is provided which helps to avoid inadvertently switching off (blocking) the switching device in the event of pressure fluctuations, in the scope of which the (actual) operating pressure of the control medium, for example, temporarily drops below the setpoint level. In addition, reliable switching on (opening) is also achieved.

It is also conceivable to design one or both switching devices in such a way that they have two switching thresholds. In such an embodiment, it may be provided that the first switching threshold for assuming the open position is above the second switching threshold for assuming the blocked position. The switching thresholds may, for example, be selected in such a way that the first switching threshold corresponds to a (setpoint) operating pressure level of the particular control medium, and the second switching threshold corresponds, for example, to a pressure level below the intended (setpoint) control medium operating pressure level. In this way, once again it is possible in the above-mentioned manner to avoid inadvertent switching off during fluctuations of the (actual) operating pressure, and also, analogously to the above discussion, to reliably switch off when the pressure falls below a minimum pressure, for example for an emergency shut-off. In addition, it is thus possible to ensure opening or switching on only when the operating pressure of the control medium actually prevails.

In the proposed fuel injector arrangement, a (first) control line which in particular conducts the control medium (barrier fluid) is led by means of the third fluid supply path to the first switching device for controlling its fluid pressure, in particular to a control input provided for this purpose. This control line preferably opens downstream from an inlet of the third fluid supply path at the first switching device. In addition, the fuel injector arrangement preferably has a further (second) control line which in particular conducts the control medium (combustion gas), and which is led by means of the second fluid supply path to the second switching device for controlling its fluid pressure, in particular once again to a control input provided for this purpose. This control line opens from the second fluid supply path, in particular downstream from the first switching device.

In the proposed fuel injector arrangement, the first and second switching devices, and also in particular the control lines discussed above, are each preferably situated upstream and also preferably remote from the particular required positions in the fluid supply paths (switching device), or branched off (control line). Unintended effects on the switching functionality of the switching devices due to (operation-related) pressure differences possibly occurring at the required positions may thus be effectively avoided. In this regard, a particular switching device may preferably be formed in a particular fluid supply path on the inlet side or oriented toward the inlet side of a, or the, fuel injector that is thus used.

With the proposed fuel injector arrangement it is possible to easily switch the different fluids on and off, and in particular for switching on, also in the intended order of barrier fluid, combustion gas, and then control fluid. For switching off combustion gas, for example within the scope of an emergency shut-off signal, the fluid, i.e. in particular control fluid, supplied via the first fluid supply path is automatically switched off.

The fuel injector arrangement, after switching on the fluid under operating pressure on the upstream side to a particular fluid supply path, is preferably configured to first open the second fluid supply path (combustion gas path) via the first switching device and the (operating) fluid pressure in the third fluid supply path (barrier fluid path), and then to open the first fluid supply path (control fluid path), in particular automatically, via the second switching device and the (operating) fluid pressure prevailing in the second fluid supply path downstream from the first switching device. In this regard, by means of the switching devices it is possible to achieve automatic, cascading switching (on) of fluid to a fuel injector, in particular allowing simultaneous switching on of the fluids under operating pressure at the upstream side of the fluid supply paths. The control effort is advantageously clearly minimized compared to previously known approaches, and the intended quick connection of the fluids is also achievable.

Embodiments of the fuel injector arrangement may generally be provided in such a way that the first and/or the second switching device (preferably both switching devices) is/are a fluid pressure-controlled valve, for example a 2/2-way valve, also in particular with an automatic reset function. When a predetermined control pressure level (switching threshold; at a control input) is reached, such a valve may be opened under control by fluid pressure, and when the control pressure is below this level, the valve may be reset, for example via a spring load in the valve.

Embodiments of the fuel injector arrangement are particularly preferred, and advantageously are extremely easy to implement, in which the first and/or the second switching device, in particular both the first and second switching devices, has/have or is/are an unblockable check valve. With such an embodiment of the switching device, an extremely favorable, standardized valve solution may be used with the fuel injector arrangement, in particular a fuel injector thereof, which is easily providable in miniature form and integratable into a fuel injector housing.

An unblockable check valve is preferably controlled by differential pressure, and in particular has a (fluid) control input or connection, in addition to a first and second (fluid) connection in particular. In an intended flow direction, for example oriented from the first connection toward the second connection, the unblockable check valve may allow free flowthrough in a blocking direction, and for example, oriented from the second connection toward the first connection may prevent or block flowthrough. With an unblockable check valve, it is significant that, under appropriate action of pressure on the control input, flow may also pass through the check valve in the blocking direction, thus unblocking it (i.e., according to the above definition, flow may pass from the second connection to the first connection).

Within the scope of the present disclosure, a respective unblockable check valve is situated in particular in the associated fluid supply path in such a way that flow may pass through the check valve via the fluidically controlled control input in the blocking direction during fluid pressure-controlled unblocking, wherein the blocking direction also in particular corresponds to the direction from the upstream side of the fluid supply path toward the downstream side thereof, and in this regard corresponds to an operating flow direction of the fluid supply path.

The unblockable check valve, without corresponding action by control pressure, is thus able to block the fluid supply path in its intended operating flow direction, and on the other hand to open the fluid supply path with corresponding action by control pressure, i.e., by active opening. For this purpose a differential pressure threshold value may be suitably selected (i.e., between the control connection and the connection of the unblockable check valve in the operating flow direction on the upstream side), in which the intended unblocking reliably takes place when the operating pressure level is present at the control connection and at the outlet connection.

If the pressure difference falls below the threshold value for unblocking, in this installation position in which flowthrough opposite the actual valve flowthrough direction is provided, the check valve also reliably switches into the blocked position and holds it (with the source pressure still present). After switching off particular fluid sources, any necessary pressure reduction may take place by flow in the flowthrough direction, for example for a pressureless circuit or a shutdown.

Within the scope of the present disclosure, the first switching device is controllable in particular via the fluid in the first flow path (in particular control fluid), and in this regard is preferably hydraulically actuatable or controllable. In addition, the second switching device is controllable in particular via the fluid in the second fluid supply path (in particular combustion gas), and in this regard is preferably pneumatically actuatable or controllable. By use of the disclosure, a particular switching device may be situated in a fuel injector of the fuel injector arrangement or outside of same.

Within the scope of the present disclosure, a fuel injector arrangement may also be provided, in particular as discussed above, which has at least one unblockable check valve for fluid pressure-controlled opening and blocking of a fluid supply line, led across the particular unblockable check valve, by action of fluid pressure by a further fluid supply line, the unblockable check valve being accommodated in particular in a fuel injector of the fuel injector arrangement. Particularly advantageous embodiments of the fuel injector arrangement may be achieved in particular with such an unblockable check valve.

An internal combustion engine having at least one fuel injector arrangement as discussed above is also proposed within the scope of the present disclosure.

Further features and advantages of the disclosure result from the following description of exemplary embodiments of the disclosure, with reference to the figures of the drawings which show particulars essential to the disclosure, and the claims. The individual features may in each case be implemented individually or collectively in various combinations in a variant of the disclosure.

BRIEF DESCRIPTION OF DRAWINGS

Preferred embodiments of the disclosure are explained in greater detail below with reference to the appended drawings, which show the following.

DETAILED DESCRIPTION OF DRAWINGS

Figure 1:
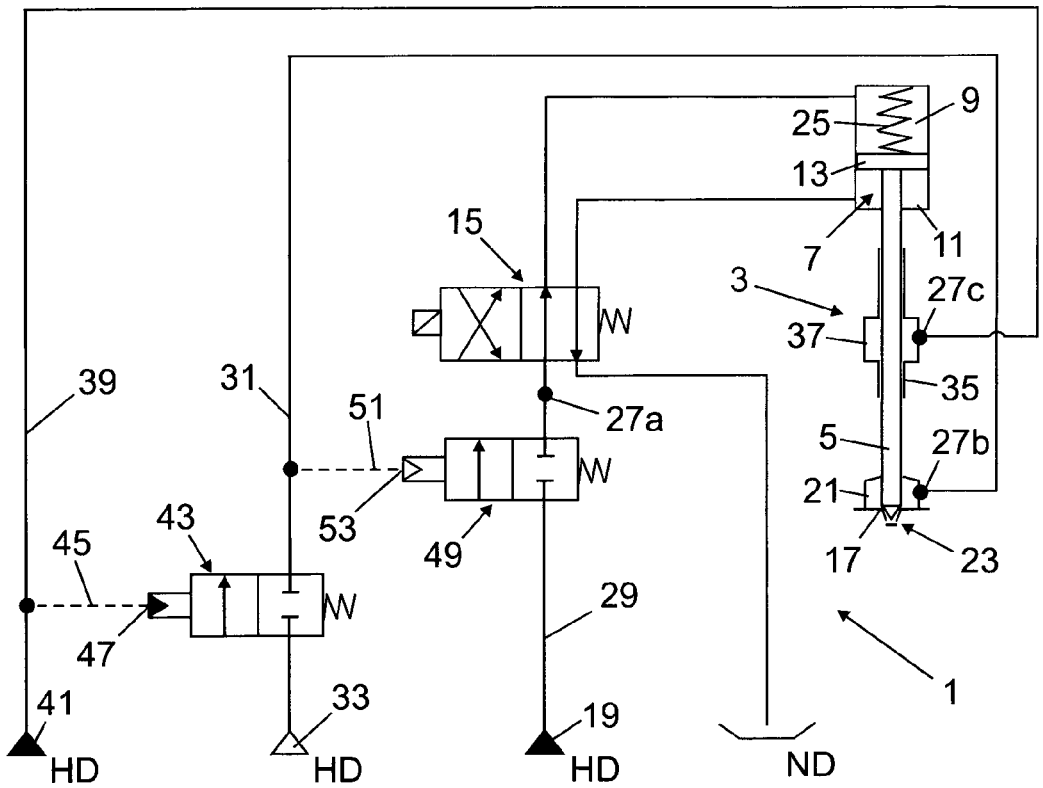
FIG. 1 schematically shows by way of example a fuel injector arrangement according to one possible embodiment of the disclosure.

In the following description and the drawings, elements having an identical or comparable function are denoted by the same reference numeral.

FIG. 1 shows a fuel injector arrangement 1, in particular having a fuel injector 3 that is provided for spraying out combustion gas. The fuel injector 3 includes at least one combustion gas nozzle valve element 5, and also preferably a liquid fuel nozzle valve element (FIG. 1 shows only a combustion gas nozzle valve element 5 by way of example). The fuel injector 3 is preferably a dual-fuel fuel injector, i.e., configured for spraying out combustion gas and also liquid fuel.

For controlling the combustion gas nozzle valve element 5, the fuel injector 3 has a piston control assembly 7 that includes a first control chamber 9 and a second control chamber 11, between which a piston 13 of the piston control assembly 7, connected to the combustion gas nozzle valve element 5, is hydraulically controllable to move back and forth, i.e., via appropriate action of pressure and relief of pressure on the control chambers 9, 11 by means of a control fluid. For switching control fluid on and off to the control chambers 9, 11 as needed, the fuel injector 3 also has a control valve 15 (pilot valve), preferably in the form of a 4/2-way valve.

Although not explicitly illustrated, analogously to the fuel injector 3 discussed with reference to FIG. 1, which has a control circuit with the piston control assembly 7 and the control valve 15 connected thereto, in one embodiment of the fuel injector 3 the control circuit may preferably have a plurality of piston control assemblies 7, via which the lift of each combustion gas nozzle valve element 5 is controllable, wherein the plurality of piston control assemblies 7 may be controlled, for example, via a single control valve 15 of the control circuit. Such a fuel injector 3 is designed in particular as a multineedle combustion gas injector, wherein the multiple combustion gas nozzle valve elements 5 (needles) may be arranged around a central liquid fuel nozzle valve element, for example, once again also with a design of the fuel injector 3 as a dual-fuel fuel injector.

In particular, once again with reference to FIG. 1, the combustion gas nozzle valve element 5, corresponding to the operating principle of the fuel injector 3, may be controlled to leave a nozzle valve seat 17 if the upper control chamber 9, i.e., remote from the nozzle, is relieved of load (outflow of control fluid via the control valve 15 to a low-pressure side (ND)), and the lower control chamber 11, i.e., near the nozzle, is subjected to load (inflow of control fluid acted on by (high) pressure (HD) from a control fluid source 19 via the control valve 15), and when the pressure conditions at the control chambers 9, 11 are reversed, is controlled to once again enter the seat 17. Upon liftoff from the seat 17, combustion gas may pass from a combustion gas nozzle chamber 21 to a downstream combustion gas nozzle assembly 23, via which it is sprayed out for combustion gas operation. A closing spring 25 (compression spring) may be provided in the control chamber 9 remote from the nozzle in order to assist with closing force.

For supplying the control circuit, in particular via an inlet thereof, with control fluid that is acted on by (high) pressure, the fuel injector arrangement 1 has a first fluid supply path 29, i.e., in particular a control fluid path 29. Within the scope of the proposed fuel injector arrangement 1, this fluid supply path leads from an end on the source side, i.e., on the upstream side, into the fuel injector 3 and opens into or within same on the downstream side, i.e., at a required position 27a (which in the present case is formed by the control circuit, in particular the inlet thereof). Within the scope of a fuel injector operation, for example a control fluid source 19, preferably a control oil source, may be connected to the end of the control fluid path 29 on the upstream side.

For supplying combustion gas to the fuel injector 3, in particular to the combustion gas nozzle chamber 21 thereof, the fuel injector arrangement 1 also has a second fluid supply path 31, i.e., in particular a combustion gas path 31. Within the scope of the proposed fuel injector arrangement 1, this fluid supply path once again leads from an end on the source side, i.e., on the upstream side, into the fuel injector 3 and once again opens into or within same on the downstream side, i.e., at a required position 27b (which is formed at the combustion gas nozzle chamber 21). Within the scope of the fuel injector arrangement, the combustion gas path 31 for the combustion gas operation on the upstream side may be connected to a combustion gas source 33 that provides combustion gas at a pressure level of 350 bar or greater, for example.

As further illustrated in FIG. 1, the combustion gas nozzle valve element 5 (for a multineedle combustion gas injector, preferably all combustion gas nozzle valve elements) is/are led in an axial guide 35 and enclosed by an annular chamber 37 at a longitudinal middle section. The annular chamber 37 is provided for allowing formation of a barrier fluid seal around the combustion gas nozzle valve element 5 by means of barrier fluid under pressure, such as barrier oil, that is introduced into the annular chamber. Due to the barrier fluid seal, combustion gas is prevented from passing over into the control circuit along the guide 35 during combustion gas operation.

For supplying the barrier fluid to the one or more barrier fluid seals in the fuel injector 3, the fuel injector arrangement 1 also has a third fluid supply path 39, i.e., in particular a barrier fluid path 39. Within the scope of the proposed fuel injector arrangement 1, this fluid supply path once again leads from an end on the source side, i.e., on the upstream side, into the fuel injector 3 and once again opens into or within same on the downstream side, i.e., at a required position 27c (formed here by the barrier fluid seal or by a branch point, for example, to connect a plurality of same). Within the scope of the fuel injector arrangement 1, the barrier fluid path 39 for the combustion gas operation on the upstream side may be connected to a barrier fluid source 41, which provides barrier fluid preferably at a pressure level that is higher than the combustion gas pressure level, in particular approximately 5% to 10% higher, so that the inadvertent passing of combustion gas across the barrier fluid seal is avoided.

The fuel injector arrangement 1 designed in this way thus includes a number of fluid supply paths 29, 31, 39, namely, the control fluid path 29, the combustion gas path 31, and the barrier fluid path 39, each of which opens into or within the fuel injector 3 of the fuel injector arrangement 1 at a downstream side or at the required positions 27a, b, c.

As further illustrated in FIG. 1, the fuel injector arrangement 1 also has a first switching device 43 in the combustion gas path 31 which, controlled via the fluid pressure (control pressure) in the barrier fluid path 39, opens or blocks the combustion gas path 31, in particular controlled solely by fluid pressure and also in particular automatically (the barrier fluid is thus used as control medium for the first switching device 43). To provide this functionality, a branch of the barrier fluid path 39, i.e., a (first) control line 45, leads to a control input 47 of the first switching device 43, and via the control line 45 the control input 47 of the first switching device 43 is controllable with the fluid pressure (hydraulic) by means of the barrier fluid path 39.

The switching device 43, designed here as a valve, preferably has a switching threshold that is slightly below the (setpoint) operating pressure level of the barrier fluid, so that when barrier fluid operating pressure is present at the control input 47, the switching threshold is exceeded and the switching device 43 reliably switches into the open position (combustion gas path 31 is open), and when the value is below the switching threshold (a pressure drop, for example), switches into the blocked position (combustion gas path 31 is blocked). In this embodiment, inadvertent blocking of the combustion gas path 31 for the case of a negligible drop in the barrier fluid pressure to below the (setpoint) operating pressure level is avoided, in particular within the scope of usual pressure fluctuations, provided that the pressure does not fall below the switching threshold of the first switching device 43.

The first switching device 43 is preferably situated in the combustion gas path 31 oriented toward the upstream side of the combustion gas path 43, and in addition the control line 45 that leads to the first switching device 43 branches off close to the upstream side of the barrier fluid path 39, in particular upstream and preferably remote from its required position(s) 27c. This prevents downstream pressure differences at the required positions 27c from having an adverse effect on the pressure control of the first switching device 43.

As further shown in FIG. 1, the fuel injector arrangement 1 also has a (second) switching device 49, i.e., in the control fluid path 29, which, controlled via the fluid pressure downstream from the first switching device 43 in the combustion gas path 31, opens or blocks the control fluid path 29 (the combustion gas is thus used as control medium for the second switching device 49). For this purpose, analogously to the first switching device 43, a branch of the combustion gas path 31, i.e., a second control line 51, leads to a control input 53 of the second switching device 49, and via the control line 51 the control input 53 of the second switching device 49 is controllable with a fluid pressure (pneumatic) by means of the combustion gas path 31. The control line 51 opens out of the combustion gas path 31 downstream from the first switching device 43, so that the first switching device experiences operating pressure, present at the combustion gas path 31, only if the first switching device 43 is already switched into the open position, with operating pressure present.

The second switching device 49, once again designed as a valve here, has a switching threshold, for example, that is slightly below the operating pressure level of the combustion gas, so that with a combustion gas operating pressure level present at the control input, the switching threshold is reliably exceeded and the switching device 49 switches into the open position (combustion gas path 31 is open), and when the pressure falls below the switching threshold, switches into the blocked position (combustion gas path 31 is blocked). Also in this embodiment of the switching device 49, once again inadvertent blocking of the control fluid path 29 for the case of a negligible drop in the combustion gas pressure to below the (setpoint) operating pressure level is avoided, in particular within the scope of usual pressure fluctuations, provided that the pressure does not fall below the switching threshold of the second switching device 49.

With this embodiment of the fuel injector arrangement 1, it is possible for all fluid supply paths 29, 31, 39 to be simultaneously acted on by the respective operating pressure on the upstream side, wherein first the combustion gas path 31 is enabled via the barrier fluid, and subsequently the control fluid path 29 is enabled via the combustion gas or the particular (operating pressure) level prevailing at that location. In this regard, with only minor construction effort, quasi-automatic switching of the fluids to the fuel injector 3 may advantageously be achieved, in particular in the intended order of barrier fluid, combustion gas, and control fluid. With this embodiment it is also possible to achieve simple, virtually immediate switching off of the supply of all three fluids to the fuel injector 3, for which purpose it is necessary only to switch off the barrier fluid on the source side.

In this embodiment according to FIG. 1, a particular switching device 43, 49 is in each case designed as a valve, in particular a ⅔-way valve. For switching the particular valve into the open position, it is controlled by fluid pressure via the respective control input 47 or 53 thereof (control side), i.e., via the respective control line 45, 51 that is led thereto, while a spring load on the particular valve ensures an automatic reset function, i.e., when the pressure falls below the switching threshold. Upon resetting, the fluid supply path 31 or 29 associated with the valve is blocked.

Figure 2:
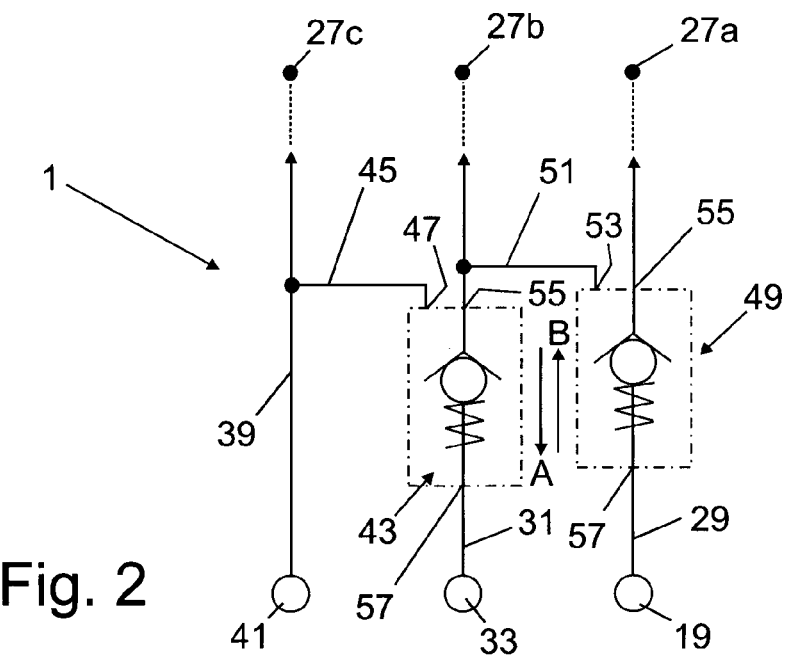
FIG. 2 schematically shows by way of example fluid conduction paths and switching devices according to another possible embodiment of a fuel injector arrangement according to the disclosure.

With reference to FIG. 2, one preferred embodiment of the fuel injector arrangement 1 is now discussed in which, in contrast to the above-discussed embodiment, the first switching device 43 and the second switching device 49 are each formed as an unblockable check valve. Accordingly, this is the focus of FIG. 2.

FIG. 2, analogously to FIG. 1, shows the fluid supply paths 29, 31, 39 of the fuel injector arrangement 1, i.e., for control fluid, combustion gas, and barrier fluid, and sources 19, 33, 41 situated upstream by way of example. A respective required position 27a, b, c is illustrated on the downstream side.

In this embodiment of the fuel injector arrangement 1, which has at least one unblockable check valve 43, 49 for fluid pressure-controlled opening and blocking of a fluid supply line 29, 31, led across the respective unblockable check valve 43, 49, by action of fluid pressure by means of a further fluid supply line 39, 31, the first switching device 43, which is formed as a (first) unblockable check valve and situated in the combustion gas flow path 31, may be acted on by pressure, i.e., at the prevailing pressure level in the barrier fluid path 39, via a control line 45, which is led to a control input 47 of the unblockable check valve as in the embodiment according to FIG. 1, by means of the barrier fluid path 39. The control of the first unblockable check valve 43 at its control input 47 takes place here hydraulically, and the barrier fluid is used once again as control medium.

Analogously, the second switching device 49, which is likewise formed as an unblockable (second) check valve and situated in the control fluid path 29, is controllable via a control line 51 by means of the combustion gas path 31, as in the embodiment according to FIG. 1, the control line 51 branching off from the combustion gas path 31 downstream from the first switching device 43. A control input 53 of the unblockable check valve 49 may thus be acted on by the pressure level that prevails in the combustion gas path 31 downstream from the first unblockable check valve 43, via the control line 51. The control of the second unblockable check valve 49 at its control input 53 takes place here pneumatically, and the combustion gas is once again used as control medium.

The first and second unblockable check valves, i.e., switching devices 43, 49, each have a flowthrough direction (A) that points from a first connection 55 to a second connection 57, and a blocking direction (B) that points from the second connection 57 to the first connection 55. It is apparent that the unblockable check valves 43, 49 are situated in the respective fluid supply path 31, 29 in such a way that a flow into same by the respective source 33 or 41 pushes the unblockable check valves 43, 49 into the blocked position. In this regard, flow passes through a respective unblockable check valve 43, 49 in its blocking direction B via the fluid supply path 29, 31 during operation of the fuel injector arrangement 1, which corresponds to an operating flow direction of the respective fluid supply path 29, 31.

In order for flow to still be able to pass through an unblockable check valve 43, 49 from the upstream side of the fluid supply path 29 or 31 toward the downstream side (i.e., in the operating flow direction) when it is pushed into the blocked position with a source load present, the fuel injector arrangement 1 is configured so that it is able to open or block the check valve by active control via the control input 47 or 53. For this purpose, a pressure difference between the control fluid pressure (at the control input 47, 53) and the operating pressure ((valve) upstream side (connection 57)) is suitably set (differential pressure control) by means of the fuel injector arrangement 1, for example by use of a pressure controller. Flowthrough in the respective blocking direction B is then made possible upon unblocking.

The present disclosure advantageously makes use of this simple operating principle, wherein the particular unblockable check valves 43, 49 also advantageously achieve the intended functionality, so that when the control pressure drops below a threshold value (with operating pressure still present at the (valve) upstream side (connection 57)), automatic closing and holding of the closed state is reliably ensured.

The unblockable check valves 43, 49 may advantageously be obtained and installed in miniaturized and standardized form, so that a simple, favorable design of the fuel injector arrangement 1 may be achieved. In addition, such a fuel injector arrangement 1 also results in all the advantages discussed above for the embodiment according to FIG. 1. A respective unblockable check valve 43, 49 may preferably be situated or installed in particular in the fuel injector 3 of the fuel injector arrangement 1, or alternatively, also outside the fuel injector 3, for example.

LIST OF REFERENCE NUMERALS 1 fuel injector arrangement
3 fuel injector
5 combustion gas nozzle valve element
7 piston control assembly
9 first control chamber
11 second control chamber
13 piston
15 control valve
17 seat
19 control fluid source
21 combustion gas nozzle chamber
23 combustion gas nozzle assembly
25 compression spring
27a, b, c required position
29 first fluid supply path (control fluid path)
31 second fluid supply path (combustion gas path)
33 combustion gas source
35 guide
37 annular chamber (barrier fluid seal)
39 third fluid supply path (barrier fluid path)
41 barrier fluid source
43 first switching device
45 control line
47 control input
49 second switching device
51 control line
53 control input
55 connection
57 connection
ND low-pressure side
HD high pressure
A flowthrough direction
B blocking direction

What is claimed is:

1. A fuel injector arrangement comprising:
a first fluid supply path;
a second fluid supply path;
a third fluid supply path;
a first switching device in the second fluid supply path, configured to be controlled based on fluid pressure in the third fluid supply path to controllably open and block the second fluid supply path; and
a second switching device in the first fluid supply path, configured to be controlled based on fluid pressure in the second fluid supply path downstream from the first switching device to controllably open and block the first fluid supply path.

2. The fuel injector arrangement of claim 1, wherein the first fluid supply path is a control fluid path, the second fluid supply path is a combustion gas path, and the third fluid supply path is a barrier fluid path.

3. The fuel injector arrangement of claim 1, wherein:
the first switching device, based on fluid pressure in the third fluid supply path after switching on operating pressure in each case on an upstream side of one or more of the first fluid supply path, the second fluid supply path, and the third fluid supply path, is configured to first open the second fluid supply path; and
the second switching device, based on fluid pressure in the second fluid supply path downstream from the first switching device, is configured to open the first fluid supply path.

4. The fuel injector arrangement of claim 1, wherein at least one of the first switching device and the second switching device is a fluid pressure-controlled 2/2-way valve with an automatic reset function.

5. The fuel injector arrangement according to claim 1, wherein at least one of the first switching device and the second switching device comprises an unblockable check valve.

6. The fuel injector arrangement of claim 1, wherein fluid pressure of the first fluid supply path or the second fluid supply path that controls at least one of the first switching device and the second switching device based on fluid pressure acts on a control input of respective ones of the first switching device and the second switching device.

7. The fuel injector arrangement of claim 6, wherein at least one of the first switching device and the second switching device is arranged in the fluid supply path and configured as a check valve configured to permit flow in a blocking direction based on the control input when unblocked and corresponding to an operating flowthrough direction of the fluid supply path.

8. The fuel injector arrangement of claim 1, wherein the first fluid supply path, the second fluid supply path, and the third fluid supply path each open to a downstream side within a fuel injector or in a fuel injector of the fuel injector arrangement.

9. The fuel injector arrangement of claim 8, wherein at least one of the first switching device and the second switching device is configured to perform automatic, cascading fluid switching to the fuel injector with substantially simultaneous switching of fluid under operating pressure to an upstream side of at least one of the first fluid supply path, the second fluid supply path, and the third fluid supply path.

10. The fuel injector arrangement of claim 8, wherein at least one of the first switching device and the second switching device is arranged in the fuel injector.

11. The fuel injector arrangement of claim 1, wherein the first switching device is configured to be hydraulically actuated.

12. The fuel injector arrangement of claim 1, wherein the second switching device is configured to be pneumatically actuated.

13. An internal combustion engine, comprising at least one fuel injector arrangement comprising: a first fluid supply path;
a second fluid supply path;
a third fluid supply path;
a first switching device in the second fluid supply path, configured to be controlled based on fluid pressure in the third fluid supply path to controllably open and block the second fluid supply path; and
a second switching device in the first fluid supply path, configured to be controlled based on fluid pressure in the second fluid supply path downstream from the first switching device to controllably open and block the first fluid supply path.

14. A method of supplying fuel, comprising:
providing fluid pressure to a first fluid supply path in fluid communication with a first switching device in a second fluid supply path;
opening, by the first switching device and based on fluid pressure in the first fluid supply path, the second fluid supply path to second switching device in a third fluid supply path;
blocking, by the first switching device and based on fluid pressure in the first fluid supply path, the second fluid supply path;
opening, by the second switching device and based on fluid pressure in the second fluid supply path, the third fluid supply path; and
blocking, by the second switching device and based on the fluid pressure in the second fluid supply path, the third fluid supply path.

15. The method of claim 14, wherein the first fluid supply path is a control fluid path, the second fluid supply path is a combustion gas path, and the third fluid supply path is a barrier fluid path.

16. The method of claim 14, further comprising:
opening the second fluid supply path, by the first switching device, based on fluid pressure in the third fluid supply path after switching on operating pressure in each case on an upstream side of one or more of the first fluid supply path, the second fluid supply path, and the third fluid supply path; and
opening the first fluid supply path, by the second switching device, based on fluid pressure in the second fluid supply path downstream from the first switching device.

17. The method of claim 14, further comprising controlling a control input of respective ones of the first switching device and the second switching device based on fluid pressure of the first fluid supply path or the second fluid supply path.

18. The method of claim 17, further comprising permitting flow in a blocking direction based on the control input when unblocked and corresponding to an operating flowthrough direction of the first fluid supply path or the second fluid supply path, wherein at least one of the first switching device and the second switching device is arranged in the first fluid supply path or the second fluid supply path and configured as a check valve.

19. The method of claim 14, is configured to performing, by at least one of the first switching device and the second switching device, automatic, cascading fluid switching to a fuel injector with substantially simultaneous switching of fluid under operating pressure to an upstream side of at least one of the first fluid supply path, the second fluid supply path, and the third fluid supply path, wherein the first fluid supply path, the second fluid supply path, and the third fluid supply path each open to a downstream side within the fuel injector.

20. The method of claim 14, wherein at least one of the first switching device and the second switching device is a fluid pressure-controlled 2/2-way valve with an automatic reset function.

* * * * *